Feb. 27, 1962 YASUSHI HOSHINO ET AL 3,023,010

MEANS FOR PROTECTING A MAGNETIC SOUND RECORD SHEET FROM STRAY MAGNETIC FIELD

Filed June 17, 1959 2 Sheets-Sheet 2

3,023,010
Patented Feb. 27, 1962

3,023,010

MEANS FOR PROTECTING A MAGNETIC SOUND RECORD SHEET FROM STRAY MAGNETIC FIELD

Yasushi Hoshino, 462 1-chome, Tamagawa-Okusawacho, Setagaya-ku, Tokyo, Japan; Mamoru Namikawa, 664 Kugahara-cho, Ota-ku, Tokyo, Japan; and Shigezo Tochihara, 531 Matsunoki Jyutaku, Matsunoki-cho, Suginami-ku, Tokyo, Japan Filed June 17, 1959, Ser. No. 820,993
Claims priority, application Japan July 1, 1958
1 Claim. (Cl. 274—41.4)

This invention relates to means for protecting a magnetic sound record sheet from an outside magnetic field, and more particularly to means for protecting a magnetic sound record sheet from the influence of an outside magnetic field which it may encounter on route when dispatched as mail, said means comprising at least one magnetic shield sheet intercepting the outside magnetic field thereby to protect the magnetic sound record sheet.

A magnetic sound record sheet according to copending application No. 635,504 filed January 22, 1957, has a basic carrier sheet of a material such as paper, plastic and the like, the size of which is like a sheet of writing paper, and on one surface of the basic sheet are descriptions and on the other surface a magnetic coating film on which sound relating to said descriptions is recorded.

The magnetic coating film is thin and the magnetic sound record sheet as a whole does not differ much in thickness and weight from an ordinary sheet of writing paper.

Magnetic sound records heretofore known are generally too thick and heavy to be dispatched as ordinary mail and they require special packing and treatment. This involves extra cost for packing and an increase of postage. When it is dispatched to a foreign country, the disadvantages are more significant since custom's parcel has to pass the examination, involving payment of import duty and delay. In contrast, the magnetic sound record sheet of above mentioned copending application is thin and light, and therefore can be dispatched as ordinary mail and used conveniently for communication. However, when it is dispatched in an ordinary envelope, there is a risk that the magnetic sound record on the sheet is affected on route by a stray magnetic field which it may encounter since the mail may be placed in the vicinity of a motor, a transformer, an electrical instrument, a permanent magnet, or some other devices which create a magnetic field. In such a case, the magnetic sound record may be disturbed or attenuated greatly to make it useless.

An object of the present invention is to provide means which protects a magnetic sound record sheet during transportation as mail.

According to the present invention, the means used for the protection of magnetic sound record sheet dispatched as mail has a thin magnetic shield sheet which intercepts outside magnetic fields to protect the magnetic sound record sheet during transportation as mail.

The features and merits of the present invention will be made clear from the following explanation of embodiments as illustrated in accompanying drawings wherein FIG. 1 is a front view of a magnetic sound record sheet;

Figures 1, 2, 3, 4, 5, 6, 7, 8, 9, 10, 11:
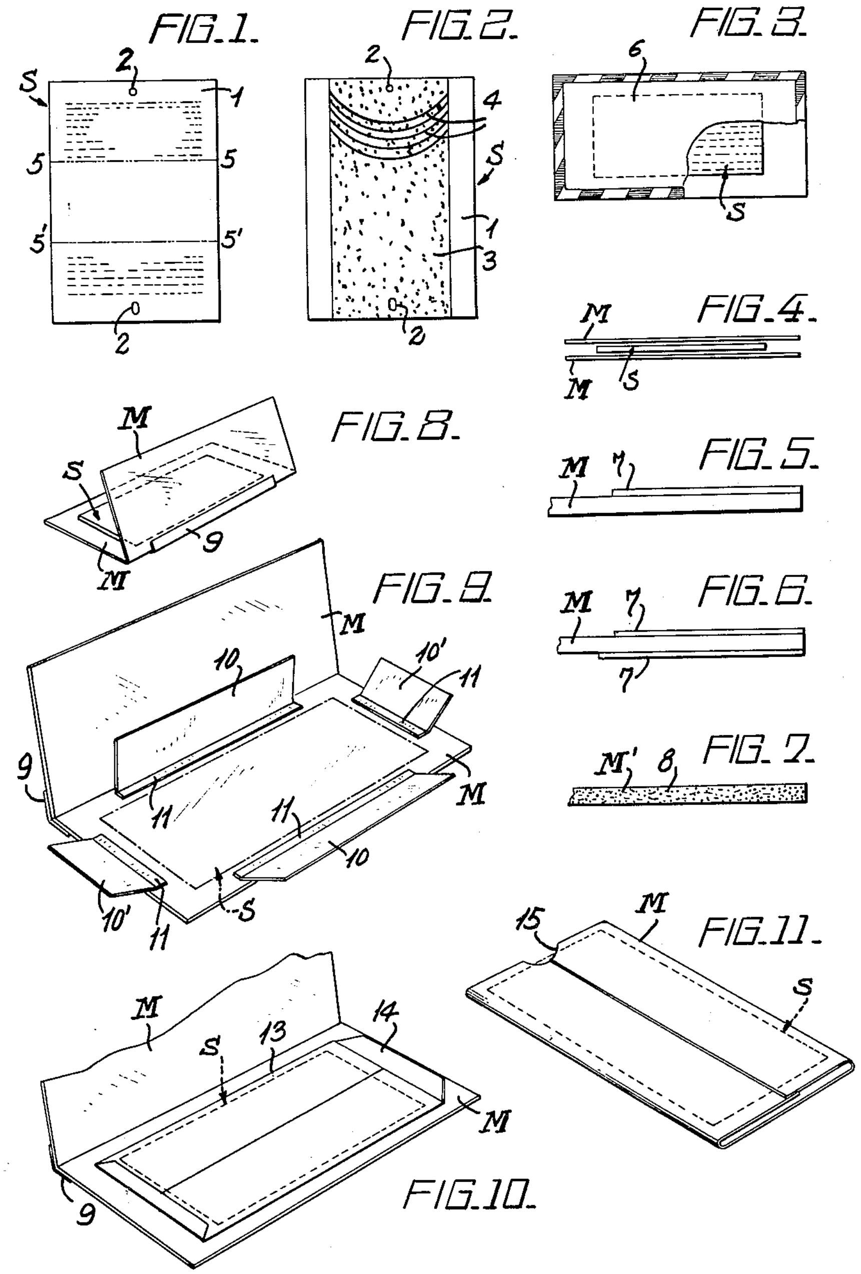
FIG. 2 is a back view of the magnetic sound record sheet of FIG. 1.
FIG. 3 is a plan view of an ordinary envelope in which a folded magnetic sound record sheet is accommodated, the envelope being broken partly away to show the magnetic sound record sheet inserted therein.
FIG. 4 is a side view of a magnetic sound record sheet interposed between two magnetic shield sheets.
FIG. 5 is a side view of a magnetic shield sheet which has a paper sheet on one surface.
FIG. 6 is a side view of a magnetic shield sheet which has a paper sheet on both surfaces.
FIG. 7 is a side sectional view of a magnetic shield sheet composed of particles of a magnetic material dispersed in paper material.
FIG. 8 is a perspective view illustrating one of the embodiments of the present invention.
FIG. 9 is a perspective view illustrating another embodiment of the present invention.
FIG. 10 is a perspective view of still another embodiment of the present invention, partly broken away.
FIGS. 11, 12, 13 and 14 are perspective views of still another embodiment of the present invention.

FIGS. 1 and 2 illustrate a magnetic sound record sheet which is to be sent by mail. Said sheet S has a basic carrier sheet 1 of a material such as paper or plastic and on the front surface are descriptions whereas on the back surface is a magnetic coating film 3. On this magnetic coating film are recorded sound record tracks 4 as illustrated in FIG. 2. Setting holes 2 are provided for setting the magnetic sound record sheet on an apparatus for sound recording and reproducing. When it is desired to send the sheet somewhere by mail, it may be folded at lines 5—5 and 5′—5′ and inserted in an envelope 6 as shown in FIG. 3, since the magnetic sound record sheet is thin and light.

With an ordinary magnetic sound record which is thick and heavy, it is necessary to pack the record as a parcel and send it by parcel post. This involves the cost of package and an increase of postage because of greater weight. Moreover, when it is dispatched abroad, the delivery of the parcel will be delayed greatly because of examination of the parcel at a custom-house.

When the magnetic sound record sheet can be dispatched by ordinary mail, all the disadvantages described above will be eliminated.

However, when the magnetic sound record sheet as illustrated by FIGS. 1 and 2 is transported in an ordinary envelope, the sound record tracks 4 may be attenuated or destroyed by a stray magnetic field which it may encounter on route since the mail may be placed in the vicinity of a motor, a transformer, electrical instruments or a permanent magnet or other devices which generate a strong magnetic field.

According to the present invention, the magnetic sound record sheet S is protected with means comprising at least one magnetic shield sheet M. FIG. 4 illustrates one of such means which has two separate magnetic shield sheets M. When a magnetic sound record sheet S is interposed between two magnetic shield sheets as shown in FIG. 4 and the assembly is inserted into an envelope and dispatched, the magnetic record tracks of the sheet will not be affected at all even if they happen to pass a magnetic field since they are protected from the magnetic field by the magnetic shield sheets M. The magnetic shield sheets M may be a thin film of a metal of high magnetic permeability (e.g. an alloy known by the name of "Permalloy," pure iron, etc.) or a metal sheet of high magnetic permeabiltiy on one surface of which a film of non-magnetic material such as paper or plastic 7 is pasted as illustrated in FIG. 5 in order to improve the appearance and touch of the magnetic shield sheet. Of course such a film of non-magnetic material may be applied on both surfaces of the metal sheet as illustrated in FIG. 6.

Further, a magnetic shield sheet M may be formed by dispersing particles of magnetic material of high permeability M′ in a sheet 8 of paper or plastic as illustrated in FIG. 7.

FIG. 9 illustrates an assembly of two magnetic shield sheets M joined together by a thin piece of paper or the like 9 which serves as a hinge. This assembly is more convenient for inserting a magnetic sound record sheet S between the two shield sheets than in the case of two separate independent magnetic shield sheets.

However, with the assembly of FIG. 9, there will be still a possibility that a magnetic sound record sheet slips out from between the two magnetic shield sheets during transportation.

Accordingly it is preferable to use holding elements as illustrated in FIG. 9. In the drawing, M represents a magnetic shield sheet provided with several holding elements 10, 10′. These elements are small pieces of paper, cloth, or the like which are pasted on the surface of the magnetic shield sheet M by their edge portion 11 respectively along the place where a magnetic sound record sheet S is to be placed. These elements can be folded down to hold the magnetic sound record sheet in its position as illustrated by dot-chain line in the drawing. After holding a magnetic sound record sheet in its position by bending said holding elements 10, 10′, another magnetic shield sheet M hinged at 9 to the first magnetic shield sheet M is folded down on the magnetic sound record sheet S to position the record sheet between the two magnetic shield sheets.

When this assembly is inserted into an envelope and is dispatched as mail, the sound record tracks of the magnetic sound record sheet cannot be impaired as it is protected by the shield sheets.

The desired protection may also be obtained by pasting an envelope on a magnetic shield sheet M as illustrated in FIG. 10. In the drawing, 13 represents an envelope in which a magnetic sound record sheet S is inserted. The envelope 13 is pasted on a magnetic shield sheet M and is sealed by flags 14 of the envelope. Another magnetic shield sheet hinged at 9 is folded down to hold the envelope between the two magnetic shield sheets M. The assembly as illustrated in FIGS. 8, 9 and 10 may be inserted in an envelope for dispatch as mail but may also be dispatched without an envelope simply by sealing the two magnetic shields by any conventional means so that the two magnetic shields can be open.

FIG. 11 shows a magnetic shield sheet M of which the opposite side portions are folded to embrace a magnetic sound record sheet S placed on the central portion of the magnetic shield sheet. When such a magnetic shield sheet is used, it will be convenient to provide a cut portion 15 as shown in the drawing on edge portions of the shield sheet. This cut portion facilitates inserting and withdrawing of a magnetic sound record sheet into or from the magnetic shield sheet. The magnetic sound record sheet thus embraced by the cooperation of the central portion and the folded portions of a magnetic shield sheet may be put into an envelope for dispatch as mail.

Figures 12, 13, 14, 16:
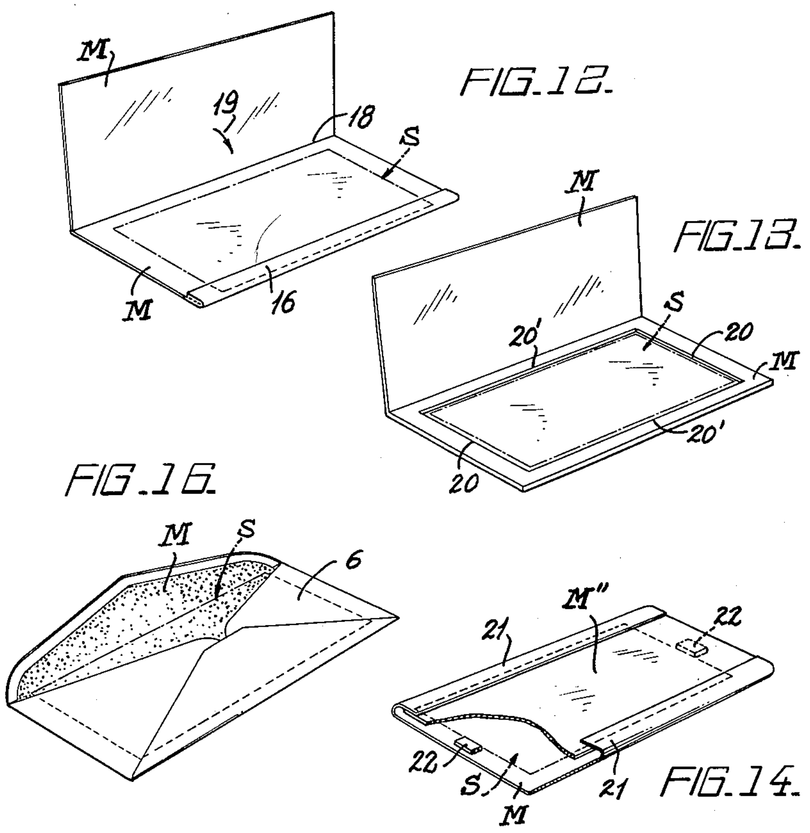
FIG. 16 is a perspective view of an envelope which has a magnetic shield layer on the inside surface of the sheet forming the envelope.

FIG. 12 illustrates another means for protection of a magnetic sound record sheet. In this embodiment, one of the magnetic shield sheets M has an edge portion 16 which is folded over the main surface of the sheet. The top and bottom ends of the folded edge are fixed on the main surface by adhesive and a magnetic sound record sheet S is inserted between the main surface and the folded edge portion 16. Then another magnetic shield sheet M hinged at 18 on the first magnetic sheet is folded down in the direction of arrow 19 to embrace the magnetic sound record sheet between the two magnetic shield sheets. This assembly may be inserted in an envelope or the two magnetic shield sheets may be sealed for dispatch as mail.

In FIG. 13, one of the magnetic shield sheets has a shallow rectangular recess 20 the size of which is substantially the same as or slightly larger than the size 20′ of a magnetic sound record sheet. After placing a magnetic sound record sheet in this recess, another hinged magnetic shield sheet is folded down to embrace the magnetic sound record sheet between the two shield sheets.

Figure 15:
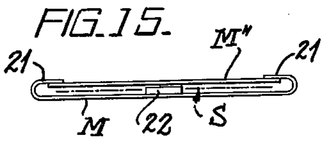
FIG. 15 is a cross sectional view of the means of FIG. 14.

FIGS. 14 and 15 illustrate another embodiment of a magnetic sound record sheet S and magnetic shield sheets M and M″. As shown in the drawings, the first magnetic shield sheet M is wider than the second magnetic shield sheet M″ and has edge portions 21 on opposite sides. Said sheet M further has embossed parts 22, 22 in top and bottom portions. A magnetic sound record sheet S is placed on this first magnetic shield between the two edge portions 21, 21 and the two embossed portions 22, 22. Then the second magnetic shield sheet is placed on the magnetic sound record sheet S and the two end portions are folded to keep the second magnetic shield in its position. The magnetic sound record sheet is prevented from slipping by the folded edges 21, 21 and the embossments 22, 22. In this condition, the assembly may be inserted in an envelope for dispatch as mail.

FIG. 16 is a view illustrating another means for protection of a magnetic sound record sheet. As shown in the drawing, the inside surface of an envelope 6 is provided with a layer of a magnetic material. This layer of magnetic material may be a thin film of a metal or an alloy of high magnetic permeability or a sheet comprising particles of a magnetic material dispersed in paper or film material as illustrated in FIG. 7. The envelope mentioned above may be easily manufactured from a sheet of paper or film which has been applied on one surface with a layer of a magnetic material by pasting, painting, or printing.

Figure 17:
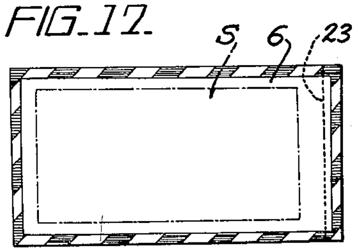
FIG. 17 is a plan view of an envelope, the inside surface of which is coated with a magnetic shield layer but the edge portion of which has no magnetic shield layer.

When a magnetic sound record sheet is sealed in such an envelope, there may be some difficulty in opening the envelope, since the sheet forming the envelope, being reinforced with the layer of a magnetic material, is too strong to be broken easily. It is, therefore, preferable to provide an edge where the sheet of an envelope has no layer of a magnetic material. FIG. 17 illustrates such an envelope 6 which has an edge portion provided with no layer of a magnetic material on the right side of chain line 23. A magnetic sound record sheet S occupies a position as illustrated by dot-chain line in the envelope and is fully protected during transportation as mail, but it is easy to open the envelope by breaking the edge portion having no layer of magnetic material.

It is apparent that this invention may be varied in detail from those embodiments illustrated in the drawing without departing from the spirit and the principle of the present invention. Accordingly it is to be understood that the invention is not limited by the above description but is limited only by the following claim.

What is claimed is:

For transporting a magnetic record sheet: an envelope including two generally rectangular sides including and connected along three edge portions thereby defining an opening through which said sheet can be inserted, a flap hingeably connected to a fourth edge portion of one of said sides adjacent said opening, said flap including an adhesive portion whereby said envelope can be sealed; and, on said flaps and sides internally of the envelope, a coating of magnetic material adapted to shield said sheet; at least one of said edge portions being free of said coating to facilitate access to said sheet.

References Cited in the file of this patent

UNITED STATES PATENTS

| | | |
|---|---|---|
| 2,668,718 | Roberts | Feb. 9, 1954 |
| 2,886,330 | Halftermeyer | May 12, 1959 |
| 2,902,329 | Brink et al. | Sept. 1, 1959 |
| 2,923,642 | Hausen | Feb. 2, 1960 |

FOREIGN PATENTS

| | | |
|---|---|---|
| 798,246 | Great Britain | July 16, 1958 |